Figure 6:
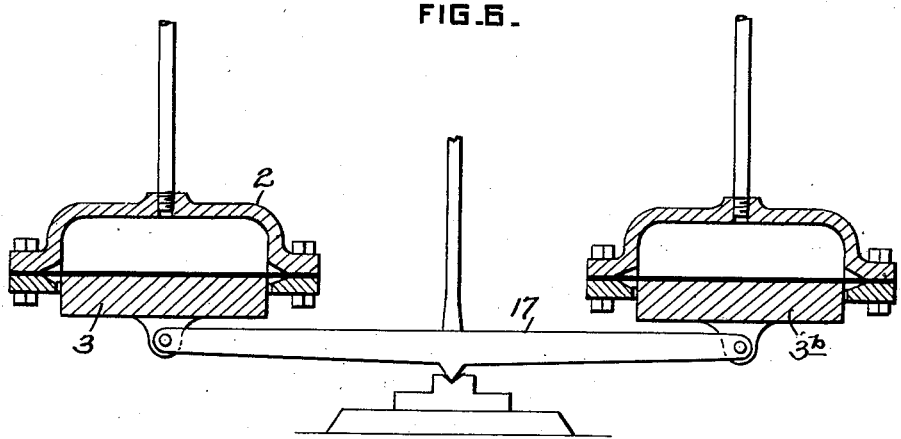

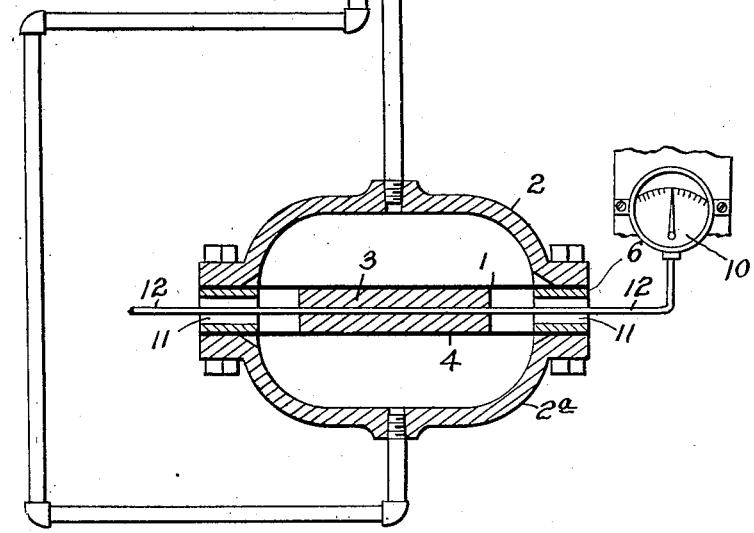

J. M. HOPWOOD.
METHOD OF AND MEANS FOR REGULATING MOVEMENT.
APPLICATION FILED DEC. 10, 1917.
1,371,242.
Patented Mar. 15, 1921.
3 SHEETS—SHEET 2.
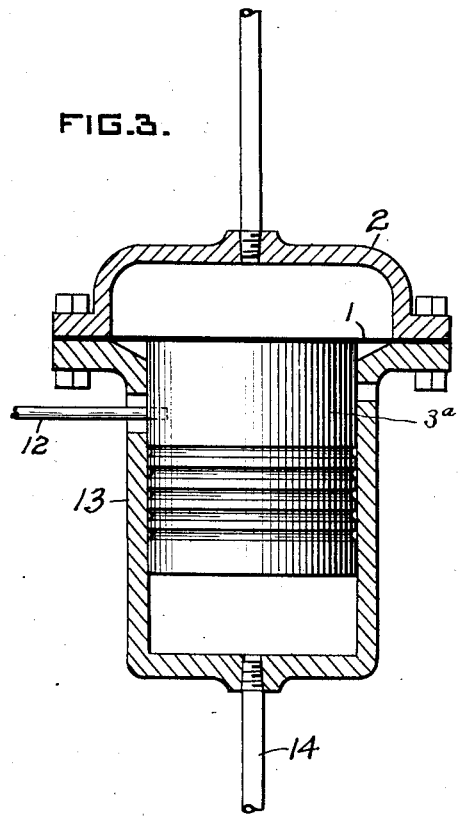
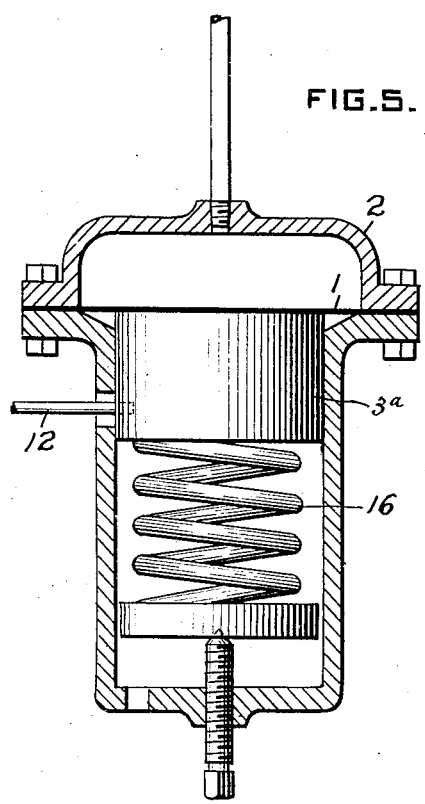
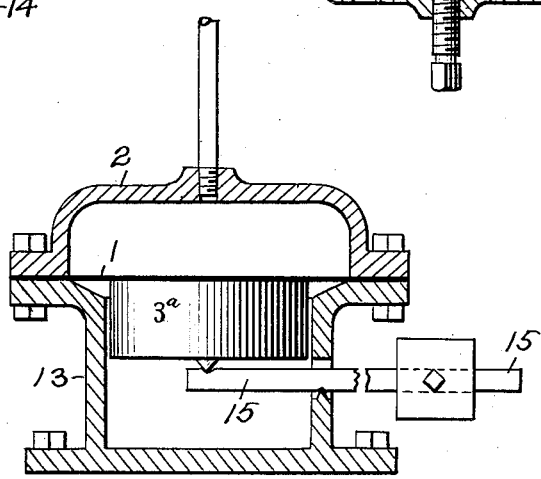

J. M. HOPWOOD.
METHOD OF AND MEANS FOR REGULATING MOVEMENT.
APPLICATION FILED DEC. 10, 1917.

1,371,242.

Patented Mar. 15, 1921.

3 SHEETS—SHEET 3.

WITNESSES

INVENTOR

UNITED STATES PATENT OFFICE.

JOHN M. HOPWOOD, OF DORMONT, PENNSYLVANIA.

METHOD OF AND MEANS FOR REGULATING MOVEMENT.

1,371,242.　　　　Specification of Letters Patent.　　Patented Mar. 15, 1921.

Application filed December 10, 1917. Serial No. 206,479.

*To all whom it may concern:*

Be it known that I, JOHN M. HOPWOOD, residing at Dormont, in the county of Allegheny and State of Pennsylvania, a citizen of the United States, have invented or discovered certain new and useful Improvements in Methods of and Means for Regulating Movement, of which improvements the following is a specification.

The invention described herein relates to a method of and mechanism for producing movements of a part or member proportional, or substantially proportional, to the pressure applied to said part or member, such method and mechanism being especially adapted for use in combination with means such as the Pitot tube, whereby pressure differences are created by the flow of fluid under pressure, such differences varying with the changes in the rate of flow of the liquid. The invention is hereinafter more fully described and claimed.

In the accompanying drawings forming a part of this specification, Figure 1 is a sectional view of a form of apparatus adapted to the practice of the invention; Fig. 2 is a sectional view illustrating the operation of the apparatus shown in Fig. 1; Fig. 3 illustrates a second form of apparatus adapted to the practice of the invention, and Figs. 4, 5 and 6 and 7 illustrate further modifications in the construction of the apparatus.

As is well known, the total pressure of a current of fluid under pressure is the resultant of two components, *i. e.*, the static pressure to which the fluid is subjected and the pressure due to the velocity of flow of the fluid, and that a change in the static pressure will not, if the rate of flow is constant, change the difference between the static and total pressures, but that if the rate of flow is changed, the difference between the static and total pressures will be proportional (up or down) to such change in velocity regardless of any change of the static pressure of the fluid. Hence it will be understood that the term "constant" as hereinafter used in reference to the pressure applied to one side of the movable part or member, is only relative, as a change merely in the static pressure on the fluid will not affect such part or member, as both sides will be influenced by such change.

In the practice of the invention, a sheet or plate 1 of suitable flexible material is so arranged across a shell 2 as to be subject to pressure on one of its surfaces within the shell. The opposite surface of the sheet bears upon the surface of a movable part or element 3 which is supported and held in contact with the sheet 1 by pressure applied to the opposite surface of the part or element, but suitable means are provided whereby the pressure serving to support the movable element is prevented from affecting the sheet 1 except through the movable element, and hence if the pressures acting oppositely on the sheet and movable element are equal, and the surfaces of the sheet and element subjected to such oppositely acting pressures have equal areas, such parts will remain stationary. But if the pressure on the sheet 1 be increased, it will be caused to assume a substantially concave shape, the periphery of the sheet being held stationary by the shell. As the movement of the sheet, when subjected to such increased pressure, will be progressively greater from the perimeter toward the center, the movement of the movable element or disk 3 will be equal to the greatest movement of the sheet, and portions of the disk adjacent to its perimeter will move away from and out of contact with the surface of the sheet opposite that to which the increased pressure was applied, thereby causing a reduction of the area of the surface of the element against which pressure is applied through the sheet, as will be readily seen by reference to Fig. 2. As the pressure acting against the opposite surface of the block is unchanged, as is also the area of the block acted on by such opposed pressure, it follows that the higher pressure acting on a reduced area will be counterbalanced by the lower constant pressure acting on the larger constant area, and the movement of the disk will cease as soon as these oppositely acting forces attain equilibrium, thus developing or establishing a regulating movement of the movable element proportional to the change in the differential of the oppositely acting pressures.

A convenient means for utilizing the method above described, *i. e.*, of producing movement of a part or element by varying the area of effective pressure on one side of such part or element, while its opposite side is subjected to a substantially constant pressure applied to a constant area, consists of a shell formed in two sections 2 and 2ᵃ having arranged between its sections a compound diaphragm consisting of sheets 1 and 4, preferably formed of resilient material so that the parts of the diaphragm will return to normal position when subjected to equal and oppositely acting pressures as hereinafter described, and an interposed part or element as a metal disk 3. In securing the sheets in position, an annulus 6 is interposed between the sheets so as to maintain them in suitable spaced relation, said annulus being preferably made of a thickness substantially equal to the thickness of the disk 3 so that the sheets will, in normal condition, be substantially parallel and the areas of contact of the sheets on opposite sides of the disk will be substantially equal. The chambers on opposite sides of the compound diaphragm are connected respectively with means for creating pressure differences from the flow of fluid under pressure, such as a Pitot tube 7 or its equivalent, a diaphragm having a contracted orifice, arranged in a pipe 8 adapted to conduct fluid under pressure. In the construction shown, the chamber above the diaphragm is so connected to the differential pressure generating means as to be subjected to the total pressure of the fluid passing along the pipe 8 and the lower chamber is so connected to such means as to be subject only to the static pressure of such flowing fluid. Of the two components of the total pressure, i. e., static pressure and pressure due to velocity, acting on the upper chamber, the former will be equal to the pressure in the lower chamber, and hence any deflection of the diaphragm will be effected solely by pressure due to the velocity of the fluid. As hereinbefore stated, any deflection of the sheet 1 of the diaphragm will result in the separation of the portions of the disk adjacent to its periphery from such upper sheet and hence, although the entire upper surface of such sheet is subjected to the same pressure, only so much of the disk as remains in contact with the sheet will be subject to such pressure. As the deflection of the diaphragm does not cause any separation of the disk and undersheet 4, there will not be any change in pressure conditions on the under side of the the disk. A reduction of area consequent on the application of increased pressure to the upper side of the disk, while the opposite side is subjected to a lower pressure, is the equivalent of increasing the pressure on the lower side at a rate proportional to the increase of pressure on the upper side, and a movement of the diaphragm will sooner or later produce an equilibrium between the forces acting on the opposite sides of the disk. As the difference between the static and total pressures of a flowing fluid has a proportional relation to the velocity of such flow, and the deflection of the diaphragm is proportional to such difference of pressure, the change of area of pressure applied to the disk will bear a proportional relation to the velocity of the flow of fluid. If the applied pressure differs only slightly from the static pressure, equilibrium between the forces acting on opposite sides of the disk will be attained by a small movement of the diaphragm and vice versa. If the difference of pressure increases, there will be a substantial movement of the diaphragm proportional to such increase in difference of pressure, so that by connecting the disk to a suitable indicating mechanism 10, the rate of flow of a fluid through a pipe at any time can be readily ascertained, or if a recording instrument be employed, any variations during a given time can be ascertained.

In order to avoid compensating for friction and errors due to variations in friction, in transmitting motion from the disk to the indicating or other mechanism, which it may be desired to operate by the disk, one or more openings 11 are formed through the spacing annulus 6, through which extends an arm or arms 12 operatively connected to the disk, the openings in the annulus being made sufficiently large to permit of the free movement of such connection without contact with the walls of the opening or openings.

In the construction shown in Figs. 1, 2, 7 and 6 and hereinbefore described, the motor is symmetrically constructed so that it is immaterial as to which chamber the parts of the differential pressure-creating means are respectively connected, as either sheet may be used as a motor member. In some cases, however, it may be preferred to employ only one sheet or flexible member for transforming pressure into motion in which case mechanism substantially such as is shown in Figs. 3, 4 and 5 can be employed. By reference to said figures, it will be seen that the upper chamber of the motor is formed by a shell section 2 similar to that shown in Fig. 1 and a single sheet is secured between the flange on such section and a similar flange on the cylinder 13 having its lower end closed. The disk $3^a$ is made in the form of a piston fitting the bore of the cylinder and having the surface of its upper end held in contact with the sheet 1 by static pressure admitted through the pipe 14. The total pressure of the fluid acts on the upper surface of the sheet. Movement of the cylindrical disk is transmitted through the connection 12 extending through an opening in the side of the cylinder. This opening will prevent the fluid under pressure at the lower end of the cylinder from acting directly against the underside of the diaphragm. In case any fluid under pressure entering the lower end of the cylinder should leak up along side of the piston, it will escape through these openings. In this construction as in the form shown in Fig. 1, the area of the opposite ends of the cylindrical disk are substantially equal so that movement of the cylindrical disk will be effected solely by pressure due to velocity.

In cases where variations in static pressure need not be taken into consideration or where the counterbalancing pressure is substantially constant, mechanical means may be employed for applying a constant pressure, to one side of the disk, as shown in Figs. 4 and 5. In the form shown in Fig. 4 pressure acting in opposition to the total pressure on the upper surface of the sheet is applied by means of a weighted lever 15 while in the construction shown in Fig. 5 a spring 16 is employed in lieu of the weighted lever. When a weighted lever is employed for applying pressure to the disk, it may be employed for transmitting the movement of the disk to an indicator or other mechanism.

As shown in Fig. 6, one of the sheets may be secured to a shell section 2 and the other sheet in another and independent section 1ª, and two parts or members, as disks, 3 and 3ᵇ, arranged on opposite ends of a lever 17, the several parts being so constructed and arranged that the disks are held by one another with surfaces against the respective sheets. When using such a construction, the differential pressure creating means will be so connected to the shell sections that one sheet will be subjected to static pressure and the other sheet to total pressure and the operation will be the same as in the form shown in Fig. 1.

Figure 7:
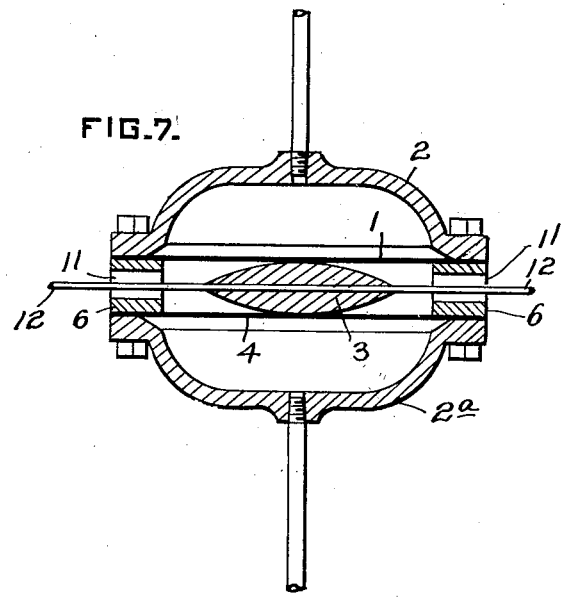

It will be understood by those skilled in the art that the motor may be so constructed, as shown in Fig. 7, that areas of contact of both sheets may be changed, the contact area of the sheet 1 with the disk decreasing as described and the area of contact of the sheet which is subjected to static pressure, increasing, provided the rate of increase of the area of contact of the latter is less than the rate of decrease of area of contact of the other sheet with the disk. It will be understood that in such cases the movement of the parts necessary to produce equilibrium between the forces operating on the disk will be smaller than in the forms shown in Figs. 1 to 5. If the surfaces of the disk with which the sheets contact are curved, there will not be any material change in the area of contact of the motor sheet with the disk, while the area to which constant pressure is applied will increase with each incremental increase of pressure on the motor sheet.

I claim herein as my invention:

1. The method of operating a regulating and controlling mechanism consisting of a movable rigid member and a flexible member so arranged as to have an area of contact with said movable rigid member variable on the movement of one of the members relative to the other, which consists in applying oppositely acting pressures to those surfaces of the said members opposite the surfaces in contact one with the other, varying one of said pressures and thereby shifting the movable rigid member and retarding such movement by changing, by the movement of the mechanism, the area of contact of the flexible member with the movable rigid member proportional to such change of pressure.

2. The method of retarding the movement of a regulating or controlling mechanism consisting of a movable rigid member and a flexible member so arranged as to have an area of contact with the movable rigid member variable on the movement of one member relative to the other, the surfaces of said members opposite the surfaces in contact one with the other being subjected to oppositely acting pressures and said members being movable on a change of one of said pressures, said method consisting in changing, by the movement of the mechanism, the area of contact of the flexible member with the movable rigid member an amount proportional to such change of pressure.

3. The method of operating a regulating or controlling mechanism consisting of a movable rigid member and a flexible member so arranged as to have an area of contact with said movable member variable on the movement of one of the members relative to the other, which consists in subjecting the surfaces of said members opposite the surfaces in contact respectively to the total pressure of a stream of fluid and to the static pressure of said stream, varying one of said pressures and thereby shifting the movable member and retarding such movement by changing, by the movement of the mechanism, the area of contact of the flexible member with the movable rigid member proportional to such change of pressure.

4. The method of retarding a movement of a regulating or controlling mechanism consisting of a movable rigid member and a flexible member so arranged as to have an area of contact with the movable rigid member variable on the movement of one member relative to the other, the surfaces of such members opposite the surfaces in contact one with the other being subjected respectively to the total pressure of the stream of fluid and to the static pressure of such stream, said members being movable on a change of one of said pressures, said method consisting in changing, by the movement of the mechanism, the area of contact of the flexible member with the movable member proportional to such change of pressure.

5. The method herein described of operating a regulating and controlling mechanism consisting of a movable rigid member and flexible members so arranged as to contact respectively with opposite sides of the movable rigid member, the area of contact between one of the flexible members and the movable rigid member being variable on the movement of one member relative to the other, which consists in subjecting the surfaces of the flexible members opposite those in contact with the intermediate member to oppositely acting pressures, changing one of said pressures and thereby shifting the movable member and retarding such movement, by changing, by the movement of the mechanism, the area of contact of one of the flexible members with the movable member proportional to such change of pressure.

6. The method of retarding the movement of a regulating or controlling mechanism consisting of a movable rigid member and flexible members so arranged as to contact respectively with opposite sides of the movable rigid member, the area of contact between one of the flexible members and the movable rigid member being variable by the movement of one member relative to the other, the surfaces of the flexible members opposite those in contact with the intermediate member being subjected respectively to the total pressure of a stream of fluid and to the static pressure of said stream whereby a change in one of said pressures will cause a movement of the movable member, said method consisting in changing, by the movement of the mechanism, the area of contact of one of the flexible members with the movable member proportionally to such change in pressure.

7. The method of retarding the movement of a regulating or controlling mechanism consisting of a movable member and flexible members so arranged as to contact respectively with opposite sides of the movable rigid member, the area of contact between one of the flexible members and the movable rigid member being variable on the movement of one of these members relative to the other, the surfaces of the flexible members opposite those in contact with the intermediate member being subjected respectively to the total pressure of a stream of fluid and to the static pressure of said stream whereby a change of said pressures will cause a movement of the movable member, said method consisting in changing, by the movement of the mechanism, the area of contact of one of the flexible members with the movable member proportional to such change of pressure.

8. The herein described method of operating a regulating or controlling mechanism consisting of a movable rigid member and flexible members arranged to so contact respectively with opposite sides of the movable rigid member that the areas of contact between the flexible and intermediate members will vary on the movement of the several members, which consists in subjecting the surfaces of the flexible members opposite those in contact with the intermediate member to oppositely acting pressures, changing one of said pressures and thereby shifting the movable rigid member and utilizing such movement to vary the areas of contact of the flexible members with the intermediate member and thereby retard the movement of the movable rigid member.

9. In mechanism for generating motion, the combination of means for generating differences of pressure by and in accordance with the flow of fluid under pressure, a sheet of flexible material held stationary at its periphery and subjected to the higher of the respective pressures, a second sheet of flexible material similarly supported in spaced relation to the first sheet and a movable disk arranged intermediate of and having its opposite sides in contact with the respective sheets the normal area of contact of the disk in the sheets being substantially less than the areas of the portions of the sheets inside their supports, and means extending from the disk for transmitting the motion imparted thereto.

10. In a mechanism for generating motion, the combination of a movable flat sheet of flexible material held stationary at its periphery and adapted to be subjected on one side to a variable fluid pressure, a disk in contact with the opposite surface of the sheet and adapted to be subjected to a substantially constant pressure acting in opposition to the fluid pressure on the sheet, said parts being so arranged that movement of the disk due to variations of pressure on the sheet will change the area of contact between the sheet and disk and means for transmitting the movements of the disk.

11. The means herein described of imparting incremental movements in accordance with incremental changes in pressure of a motive fluid which means consists of a movable member, a normally flat flexible sheet in contact with said member on one side and adapted to receive the pressure of the fluid on the other side, means for applying a counter-pressure to the side of such member opposite that on which said flexible sheet acts, and means whereby the sheet is so held outside the place of contact with the member that, when the pressure of fluid changes relative to the counter pressure, the area of contact between the sheet and member will be changed inversely to such pressure change.

In testimony whereof I have hereunto set my hand.

JOHN M. HOPWOOD.